United States Patent
Tanabiki

(10) Patent No.: US 10,221,330 B2
(45) Date of Patent: Mar. 5, 2019

(54) ACTIVE ENERGY RAY CURABLE RESIN COMPOSITION

(71) Applicant: DAICEL-ALLNEX LTD., Tokyo (JP)

(72) Inventor: Fumio Tanabiki, Ohtake (JP)

(73) Assignee: DAICEL-ALLNEX LTD., Tokyo (JP)

( * ) Notice: Subject to any disclaimer, the term of this patent is extended or adjusted under 35 U.S.C. 154(b) by 732 days.

(21) Appl. No.: 14/375,657

(22) PCT Filed: Dec. 18, 2012

(86) PCT No.: PCT/JP2012/082745
§ 371 (c)(1),
(2) Date: Jul. 30, 2014

(87) PCT Pub. No.: WO2013/114750
PCT Pub. Date: Aug. 8, 2013

(65) Prior Publication Data
US 2015/0005431 A1    Jan. 1, 2015

(30) Foreign Application Priority Data

Jan. 31, 2012   (JP) ................... 2012-019041

(51) Int. Cl.
| | | |
|---|---|---|
| *C09D 7/61* | (2018.01) | |
| *C09D 133/14* | (2006.01) | |
| *C09D 175/16* | (2006.01) | |
| *C08G 18/32* | (2006.01) | |
| *C08G 18/67* | (2006.01) | |
| *C08G 18/75* | (2006.01) | |
| *C08G 18/79* | (2006.01) | |
| *C08F 299/06* | (2006.01) | |
| *C09D 7/40* | (2018.01) | |
| *C08K 3/36* | (2006.01) | |

(52) U.S. Cl.
CPC ........ *C09D 133/14* (2013.01); *C08F 299/065* (2013.01); *C08G 18/3206* (2013.01); *C08G 18/3212* (2013.01); *C08G 18/672* (2013.01); *C08G 18/673* (2013.01); *C08G 18/755* (2013.01); *C08G 18/792* (2013.01); *C09D 7/61* (2018.01); *C09D 7/67* (2018.01); *C09D 175/16* (2013.01); *C08K 3/36* (2013.01)

(58) Field of Classification Search
CPC ............... C09D 133/14; C08F 299/065
See application file for complete search history.

(56) References Cited

FOREIGN PATENT DOCUMENTS

| | | |
|---|---|---|
| JP | 06-263809 A | 9/1994 |
| JP | 2002-212500 A | 7/2002 |
| JP | 2005-255979 A | 9/2005 |
| JP | 2006-282711 A | 10/2006 |
| JP | 2007-016145 A | 1/2007 |
| JP | 2007-016215 A | 1/2007 |
| JP | 2009-24168 A | 2/2009 |
| JP | 2009-292916 A | 12/2009 |
| JP | 2011-052227 A | 3/2011 |
| JP | 2011-248188 A | 12/2011 |
| JP | 2012-126760 A | 7/2012 |

OTHER PUBLICATIONS

Extended European Search Report for European Application No. 12867644.2, dated Aug. 20, 2015.
International Search Report issued in PCT/JP2012/082745 dated Mar. 12, 2013.

*Primary Examiner* — Ling Siu Choi
*Assistant Examiner* — Thuy-Ai N Nguyen
(74) *Attorney, Agent, or Firm* — Birch, Stewart, Kolasch & Birch, LLP

(57) ABSTRACT

Provided is an active energy ray curable resin composition for the formation of a hard coating layer on a thermoplastic resin product, where the hard coating layer is one having good resistance to scratches and abrasion and strong resistance to impact and weather or one having very good resistance to scratches and abrasion. The composition contains a urethane (meth)acrylate (A) having an average number of functional groups of 3 to 6 and having, in molecular skeleton, an organic group corresponding to a tricyclodecanedimethanol represented by following Formula (1), except for removing two hydrogen atoms of two hydroxyl groups therefrom; and a microparticulate silica (S) having a volume median diameter of 1 to 100 nm as determined by dynamic light scattering. The composition contains 10 to 40 percent by weight of the urethane (meth)acrylate (A) and 10 to 60 percent by weight of the microparticulate silica (S) based on the total weight of non-volatile matter in the composition.

[Chem. 1]

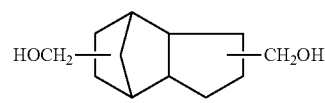

(1)

15 Claims, No Drawings

ACTIVE ENERGY RAY CURABLE RESIN COMPOSITION

The present application claims priority on the basis of Japanese Patent Application No. 2012-019041 filed in Japan on Jan. 31, 2012, the contents of which are incorporated herein by reference.

TECHNICAL FIELD

The present invention relates to an active energy ray curable resin composition that is used for the formation of a hard coating layer on a surface of a thermoplastic resin product, where the hard coating layer is one having good resistance to scratches, abrasion, impact, and weather, or one having very good resistance to scratches and abrasion. Exemplary thermoplastic resin products include films, sheets, laminates, molded articles, and extruded profiles.

BACKGROUND ART

Thermoplastic resins are used typically for the production of products such as extruded films, sheets, profiles, post-formed moldings, composite structures, and laminates. For maintaining the beauty of such thermoplastic resin products over the long term, tough and transparent hard coatings, which are resistant to scratches and abrasion, are generally applied as a surface-protecting layer. Such hard coatings generally also exhibit satisfactory surface-protecting functions typically against outdoor exposure or chemical substances such as solvents and detergents.

Multifunctional (meth)acrylate oligomers or monomers are used as regular hard coatings to be applied to thermoplastic resin products. These multifunctional (meth)acrylate oligomers or monomers are cured by the action of active energy rays and thereby give hard coatings which exhibit satisfactory scratch resistance, abrasion resistance, hardness, and chemical resistance.

The resulting hard coatings obtained from multifunctional (meth)acrylate oligomers or monomers by curing with active energy rays are resistant to scratches and abrasion to some extent, but may often suffer from cracking and failure (breakage) of the entire thermoplastic resin products upon receiving of impact. These coatings, when exposed to outdoors over the long term, may suffer from cracking or chalking. As a possible solution to this problem, there is a technique of imparting flexibility to a hard coating by the combination use of a (meth)acrylate oligomer or monomer being monofunctional or having a large double bond equivalent (PTL 1, PTL 2, and PTL 3). However, it is very difficult for this technique to provide properties required of a hard coating, i.e., rigidity (hardness), flexibility to endure impact, and weather resistance to endure long-term outdoor exposure all at satisfactory levels, because the resulting hard coating has a remarkably decreased hardness to thereby deteriorate in scratch resistance and abrasion resistance, although having better impact resistance. In other words, these properties are trade-off properties for the hard coatings.

As a possible solution to provide scratch/abrasion resistance and impact resistance both at satisfactory levels, there is proposed an active energy ray curable coating composition including silica microparticles in combination with a urethane acrylate using a polyalkylene glycol derivative (PTL 4).

CITATION LIST

Patent Literature

PTL 1: Japanese Unexamined Patent Application Publication (JP-A) No. 2005-255979
PTL 2: JP-A No. 2002-212500
PTL 3: JP-A No. H06-263809
PTL 4: JP-A No. 2007-16215

SUMMARY OF INVENTION

Technical Problem

However, the resulting coating prepared according to the technique disclosed in PTL 4 may suffer from discoloration and/or chalking when exposed to outdoors over the long term, although the coating can have certain level of resistance to scratches, abrasion, and impact.

Under these circumstances, demands have been made to provide a hard coating having good resistance to scratches and abrasion and strong resistance to impact and weather, or a hard coating having very good resistance to scratches and abrasion, where each hard coating may be used for a thermoplastic resin product.

Accordingly, an object of the present invention is to solve the problems of the customary techniques and to provide an active energy ray curable resin composition for the formation of a hard coating layer on a surface of a thermoplastic resin product, where the hard coating layer is one having good resistance to scratches and abrasion and strong resistance to impact and weather, or one having very good resistance to scratches and abrasion.

Solution to Problem

After intensive investigations to achieve the object, the present inventors found an active energy ray curable resin composition containing:

a specific urethane (meth)acrylate; and
a microparticulate silica having a specific size; and found that the resin composition, when used, can give a hard coating having good resistance to scratches and abrasion and strong resistance to impact and weather, or a hard coating having very good resistance to scratches and abrasion. The present invention has been made based on these findings.

Specifically, the present invention provides an active energy ray curable resin composition which contains:

a urethane (meth)acrylate (A) having an organic group in molecular skeleton and having an average number of functional groups of from 3 to 6, the organic group corresponding to a tricyclodecanedimethanol represented by Formula (1), except for removing two hydrogen atoms of two hydroxyl groups from the tricyclodecanedimethanol; and a microparticulate silica (S) having a volume median diameter of from 1 to 100 nm as determined by dynamic light scattering measurement, in which the active energy ray curable resin composition contains:

the urethane (meth)acrylate (A) in a content of from 10 to 40 percent by weight; and
the microparticulate silica (S) in a content of from 10 to 60 percent by weight,
based on the total weight of non-volatile matter in the active energy ray curable resin composition, where the tricyclodecanedimethanol is represented by Formula (1) expressed as follows:

[Chem. 1]

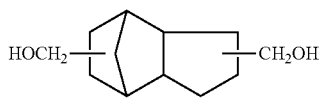

(1)

In the active energy ray curable resin composition, the urethane (meth)acrylate (A) is preferably obtained by allowing a tricyclodecanedimethanol (X), a polyisocyanate (Y), and a hydroxy-containing (meth)acrylate (Z) to react with one another.

In the active energy ray curable resin composition, the urethane (meth)acrylate (A) is preferably obtained by allowing a tricyclodecanedimethanol (X) to react with a polyisocyanate (Y) until a concentration of isocyanate groups in a reaction mixture becomes equal to or less than an end-point concentration of isocyanate groups, to give a urethane isocyanate prepolymer; and allowing the urethane isocyanate prepolymer to react with a hydroxy-containing (meth)acrylate (Z).

The active energy ray curable resin composition is preferably used for the formation of a hard coating on a surface of a thermoplastic resin molded article.

The present invention further provides a thermoplastic resin molded article having, on a surface thereof, a cured coating cured from the active energy ray curable resin composition.

Advantageous Effects of Invention

The active energy ray curable resin composition according to the embodiment of the present invention can serve as an active energy ray curable resin composition for the formation of a hard coating layer on a surface of a thermoplastic resin product, where the hard coating layer is one having good resistance to impact and weather without deterioration in scratch resistance and abrasion resistance, or one having very good resistance to scratches and abrasion.

DESCRIPTION OF EMBODIMENTS

The active energy ray curable resin composition according to the embodiment of the present invention will be illustrated in detail below.

The "urethane (meth)acrylate (A)" is also simply referred to as "(A)";
the "tricyclodecanedimethanol (X)" is also simply referred to as "(X)";
the "polyisocyanate (Y)" is also simply referred to as "(Y)"; and
the "hydroxy-containing (meth)acrylate (Z)" is also simply referred to as "(Z)."

Urethane (Meth)acrylate (A)

The urethane (meth)acrylate (A) for use in the active energy ray curable resin composition according to the embodiment of the present invention is not limited, as long as having an organic group in its molecular skeleton and having an average number of functional groups of from 3 to 6, in which the organic group corresponds to a tricyclodecanedimethanol represented by Formula (1), except for removing two hydrogen atoms of two hydroxyl groups from the tricyclodecanedimethanol.

Average Number of Functional Groups

The urethane (meth)acrylate (A) has an average number of functional groups of from 3 to 6. The average number of functional groups is more preferably from 3.5 to 5.5 and furthermore preferably from 4 to 5 so as to give a hard coating layer having good resistance to scratches and abrasion and strong resistance to impact and weather. In contrast, the average number of functional groups is more preferably from 4 to 6 and furthermore preferably from 5 to 6 so as to give a hard coating for a thermoplastic resin product, where the hard coating has very good resistant to scratches and abrasion. A urethane (meth)acrylate having an excessively small average number of functional groups may give a cured coating having insufficient scratch resistance and abrasion resistance. In contrast, a urethane (meth)acrylate having an excessively large average number of functional groups may give a cured coating having insufficient resistance to impact and accelerated weathering.

As used herein the term "average number of functional groups" of the urethane (meth)acrylate (A) referred to the average number of (meth)acryloyl groups possessed by 1 molecule of the urethane (meth)acrylate (A). For example, when a urethane (meth)acrylate (A) is prepared by the reaction of a tricyclodecanedimethanol (X), a polyisocyanate (Y), and a hydroxy-containing (meth)acrylate (Z), where the polyisocyanate (Y) is a diisocyanate, and (X), (Y), and (Z) are used in a molar ratio of 1:2:2, the average number of functional groups is 2 when Component (Z) is a monofunctional one; and the average number of functional groups is 6 when Component (Z) is a trifunctional one.

Two or more different urethane (meth)acrylates (A) which are identical or different in average number of functional groups may be used in combination as a mixture. The average number of functional groups of the mixture may be determined by weighted averaging. Typically, assume that a mixture is obtained by mixing three urethane (meth)acrylates, i.e., 0.3 mole of a urethane (meth)acrylate having an average number of functional groups of 4, 0.2 mole of a urethane (meth)acrylate having an average number of functional groups of 5, and 0.5 mole of a urethane (meth)acrylate having an average number of functional groups of 6 moles. In this case, the average number of functional groups of the mixture is found to be 5.2 by calculation according to an equation as follows:

(4×0.3+5×0.2+6×0.5)/(0.3+0.2+0.5)=5.2/1.0=5.2

Also assume that a mixture is obtained by mixing 0.3 mole of a tetrafunctional urethane (meth)acrylate using isophorone diisocyanate as a polyisocyanate with 0.7 mole of a tetrafunctional urethane (meth)acrylate using a trimer of hexamethylene diisocyanate as a polyisocyanate. In this case, the average number of functional groups of the mixture is found to be 4 by calculation according to an equation as follows:

(4×0.3+4×0.7)/(0.3+0.7)=4/1=4

Content

The urethane (meth)acrylate (A) is contained in the composition in a content of from 10 to 40 percent by weight, preferably from 15 to 35 percent by weight, and more preferably from 20 to 30 percent by weight, based on the total weight of non-volatile matter in the active energy ray curable resin composition. Particularly from the viewpoint of impact resistance and accelerated weathering resistance, the content of the urethane (meth)acrylate (A) is preferably not excessively low; whereas, from the viewpoint of scratch resistance and abrasion resistance, the content of the urethane (meth)acrylate (A) is preferably not excessively high.

Production Method

The urethane (meth)acrylate (A) may be produced typically by allowing a tricyclodecanedimethanol (X), a polyisocyanate (Y), and a hydroxy-containing (meth)acrylate (Z) to react with one another.

Exemplary production methods include, but are not limited to, the following methods:

Method 1: A method of mixing Components (X), (Y), and (Z) all together, and allowing them to react with one another.

Method 2: A method of allowing Components (X) and (Y) to react with each other to give a urethane isocyanate prepolymer containing isocyanate groups, and allowing the prepolymer to react with Component (Z).

Method 3: A method of allowing Components (Y) and (Z) to react with each other to give a urethane isocyanate prepolymer containing isocyanate groups, and allowing the prepolymer to react with Component (X).

Method 2 is preferred among Methods 1, and 3.

In contrast, a urethane (meth)acrylate (A) prepared by Method 1 may suffer from insufficient scratch resistance and abrasion resistance, because of a large quantity of a by-produced urethane isocyanate prepolymer including repeating units of the tricyclodecanedimethanol (X) and the polyisocyanate (Y). In addition, the product urethane (meth)acrylate (A) further includes complicated various compounds formed irregularly, and the product, if used in an active energy ray curable resin composition, may impede the quality control of the composition.

The reaction according to Method 3 gives a by-produced compound in which all the isocyanate groups of the polyisocyanate (Y) have reacted with the hydroxy-containing (meth)acrylate (Z). The by-product does not include a tricyclodecanedimethanol (X) skeleton. A urethane (meth)acrylate, if having no tricyclodecanedimethanol skeleton introduced in the molecular frame, may give a coating having insufficient weather resistance.

In Method 2, exemplary methods for preparing a urethane isocyanate prepolymer are as follows:

Method 2-1: A method of mixing Components (X) and (Y) all together and allowing them to react with each other.

Method 2-2: A method of adding Component (Y) dropwise to Component (X) and allowing them to react with each other.

Method 2-3: A method of adding Component (X) dropwise to Component (Y) and allowing them to react with each other.

When Method 2-2 is employed, the polyisocyanate (Y) is added dropwise to a large amount of the tricyclodecanedimethanol (X), thereby isocyanate groups at both terminals of the polyisocyanate (Y) are urethanized with hydroxyl groups of 2 moles of the tricyclodecanedimethanol (X) to form, as a by-product, a urethane isocyanate prepolymer having hydroxyl groups at both terminals as schematically illustrated by X—Y—X type, and this further reacts with 2 moles of the polyisocyanate (Y) to form, as a by-product, a compound having isocyanate groups at both terminals as schematically illustrated by Y—X—Y—X—Y type, followed by similar reactions repeatedly. As a result, compounds each having a schematic structure are formed in a large amount, where the schematic structure is specified as follows:

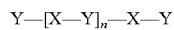

where n is an integer of 1 or more.

Such by-products, if being by-produced in large amounts and then reacting with the hydroxy-containing (meth)acrylate. (Z), give a urethane (meth)acrylate having a low acrylic density, and this may give a cured article having insufficient crosslinking density. To avoid this and to obtain a target urethane isocyanate prepolymer in a high yield, Method 2-1 or Method 2-3 is preferably employed.

Method 2-1

Method 2-1 is preferably performed by placing the tricyclodecanedimethanol (X) and the polyisocyanate (Y), and, where necessary, a diluent solvent such as butyl acetate in a reactor; raising the temperature according to necessity while stirring them to give a uniform mixture; and adding a urethanization catalyst to the mixture to initiate urethanization. After the urethanization catalyst is added, the temperature may be raised according to necessity.

If the urethanization catalyst is charged from the beginning, the urethanization reaction between the tricyclodecanedimethanol (X) and the polyisocyanate (Y) proceeds with the two components being present nonuniformly in the process of charging of the polyisocyanate (Y). Thus, the resulting urethane isocyanate prepolymer may vary in molecular weight and in viscosity, and the reaction may complete while unreacted polyisocyanate (Y) remains in the system. In this case, a by-product may be formed through the reaction between the hydroxy-containing (meth)acrylate (Z) used later and the residual polyisocyanate (Y) alone, and this may invite insufficient weather resistance, thus being disadvantageous. The content of such by-products is preferably less than 15 percent by weight relative to the weight of the target urethane (meth)acrylate (A) having a tricyclodecanedimethanol skeleton. If the content of by-products is 15 percent by weight or more, the coating may have insufficient weather resistance. Method 2-1 is industrially advantageous in that the urethane (meth)acrylate (A) can be produced in one pot.

Method 2-3

Method 2-3 may be performed by placing the polyisocyanate (Y), a urethanization catalyst, and, where necessary, a diluent solvent such as butyl acetate; stirring them to give a uniform mixture; raising the temperature according to necessity while continuing stirring; and adding the tricyclodecanedimethanol (X) dropwise to the mixture with stirring.

Method 2-3 is preferred because of giving least amounts of the following by-products mentioned in Method 2-2:

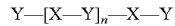

wherein n is an integer of 1 or more.

In any of the methods, it is preferred that the tricyclodecanedimethanol (X) and the polyisocyanate (Y) are allowed to react with each other until the concentration of isocyanate groups in the reaction mixture becomes equal to or less than the end-point concentration of isocyanate groups upon the synthesis of urethane isocyanate prepolymer through the reaction between the tricyclodecanedimethanol (X) and the polyisocyanate (Y). The concentration of isocyanate groups in the reaction mixture is also referred to as an "NCO group concentration."

As used herein the term "end-point concentration of isocyanate groups" refers to a concentration of isocyanate groups being higher between the theoretical concentration of isocyanate groups assuming that all hydroxyl groups charged in the system are urethanized (hereinafter also referred to as "theoretical end-point concentration of isocyanate groups") and the concentration of isocyanate groups at the time when the concentration of isocyanate groups no longer varies.

If the amount of isocyanate groups is excess to the amount of hydroxyl groups to be subjected to the reaction upon the reaction between the urethane isocyanate prepolymer and the hydroxy-containing (meth)acrylate (Z), unreacted isocyanate groups may remain to cause gelatinization and, after incorporation into the composition, to cause curing failure of the coating. To avoid these, the amount of the hydroxy-containing (meth)acrylate (Z) should be regulated so that the amount of hydroxyl groups be larger than the amount of isocyanate groups both to be subjected to the reaction.

For preventing polymerization, the reaction is preferably performed in the presence of a polymerization inhibitor such as hydroquinone, hydroquinone monomethyl ether, or phenothiazine. Such a polymerization inhibitor is added in an amount of preferably from 1 to 10000 ppm (by weight), more preferably from 100 to 1000 ppm, and furthermore preferably from 400 to 500 ppm, relative to the amount of the formed urethane (meth)acrylate (A). A polymerization inhibitor, if added in an amount of less than 1 ppm relative to the amount of the urethane (meth)acrylate (A), may not sufficiently help to inhibit polymerization. In contrast, a polymerization inhibitor, if added in an amount of more than 10000 ppm, may adversely affect properties of the product.

For a similar purpose, the reaction is preferably performed in an atmosphere of a gas containing molecular oxygen. The oxygen concentration may be appropriately chosen in consideration of safety.

The reaction may be performed while using a catalyst for a sufficient reaction rate. Exemplary catalysts usable herein include dibutyltin dilaurate, tin octylate, and tin chloride, of which dibutyltin dilaurate is preferred for satisfactory reaction rate. Such a catalyst is added in an amount of generally from 1 to 3000 ppm (by weight), and preferably from 50 to 1000 ppm. A catalyst, if added in an amount of less than 1 ppm, may not help to give a sufficient reaction rate. In contrast, a catalyst, if added in an amount of more than 3000 ppm, may adversely affect properties of the product and may, for example, reduce the light resistance.

The production of the urethane (meth)acrylate (A) may be performed in the presence of a known volatile organic solvent. Though not limited, examples of the volatile organic solvent include ethyl acetate, butyl acetate, isobutyl acetate, acetone, methyl ethyl ketone (MEK), methyl isobutyl ketone (MIBK), diisobutyl ketone, diethylene glycol monobutyl ether acetate, propylene glycol monomethyl acetate, xylenes, and toluene, of which butyl acetate, for example, is preferred from the viewpoints of boiling point and economical efficiency.

The reaction is performed at a temperature of 130° C. or lower, and more preferably at a temperature of from 40° C. to 130° C. The reaction, if performed at a temperature lower than 40° C., may not proceed at a practically sufficient reaction rate; and, if performed at a temperature of higher than 130° C., may cause radical polymerization by the action of heat, and this may cause crosslinking of double bond moiety to give a gelled product.

The reaction is generally performed until the concentration of residual isocyanate groups becomes 0.1 percent by weight or less. The concentration of residual isocyanate groups may be analyzed and determined typically through gas chromatography or titrimetry.

Tricyclodecanedimethanol (X)

The tricyclodecanedimethanol (X) is not limited and may be a commercial product, examples of which include, but are not limited to, product name "TCD Alcohol DM" (supplied by OXEA Corporation).

Polyisocyanate (Y)

Though not limited, the polyisocyanate (Y) is preferably an aliphatic polyisocyanate. Examples of such polyisocyanate (Y) include diisocyanates such as isophorone diisocyanate, 1,6-hexane diisocyanate, 2,2,4-trimethylhexamethylene diisocyanate, 2,4,4-trimethylhexamethylene diisocyanate, and diisocyanate compounds obtained through hydrogenation of aromatic isocyanates (e.g., diisocyanate compounds such as hydrogenated xylylene diisocyanate and hydrogenated diphenylmethane diisocyanate); and trimers (biuret, corresponding nurates, or adducts) derived from the diisocyanates.

Hydroxy-Containing (Meth)Acrylate (Z)

Examples of the hydroxy-containing (meth)acrylate (Z) include, but are not limited to, 2-hydroxyethyl (meth)acrylate, 2-hydroxypropyl (meth)acrylate, 4-hydroxybutyl (meth)acrylate, pentaerythritol tri-/tetraacrylate mixture, and dipentaerythritol penta-/hexa-acrylate mixture.

Reactive Diluent

The active energy ray curable resin composition according to the embodiment of the present invention may employ a reactive diluent instead of the volatile organic solvent upon the production of the urethane (meth)acrylate (A). Such a reactive diluent may also be incorporated thereafter for the purposes of regulating viscosity of the composition and regulating hardness (rigidity) of the cured coating. Exemplary reactive diluents include, but are not limited to, 1,6-hexanediol diacrylate, trimethylolpropane triacrylate, and tricyclodecanedimethanol diacrylate.

The reactive diluent may be any of commercially available products, which are exemplified by 1,6-hexanediol diacrylate (e.g., product name "HDDA" supplied by Daicel-Cytec Co., Ltd.), trimethylolpropane triacrylate (e.g., product name "TMPTA" supplied by Daicel-Cytec Co., Ltd.), and tricyclodecanedimethanol diacrylate (e.g., product name "IRR214-K" supplied by Daicel-Cytec Co., Ltd.).

Microparticulate Silica (S)

The microparticulate silica (S) (silica microparticles) for use in the active energy ray curable resin composition according to the embodiment of the present invention is not limited, as long as having a volume median diameter of from 1 to 100 nm as determined by dynamic light scattering measurement.

Silica Particle Diameter

The term "volume median diameter as determined by dynamic light scattering measurement" refers to the diameter where 50% of the distribution in an accumulated volume curve is above and 50% is below. For satisfactory transparency, the microparticulate silica (S) should have a volume median diameter of from 1 to 100 nm, and preferably from 10 to 50 nm. A microparticulate silica having a volume median diameter of less than 1 nm may not sufficiently contribute to improvements in hardness and abrasion resistance of the cured coating; and a microparticulate silica having a volume median diameter of more than 100 nm may cause low transparency, thus being undesirable.

The volume median diameter of the microparticulate silica (5) may be determined typically by a known laser diffraction/scattering technique using, for example, a particle size analyzer (e.g., product name "Nanotrac UPA-EX150" (supplied by Nikkiso Co., Ltd.)). The volume median diameter of the microparticulate silica (S) determined according to the aforementioned technique refers to the particle diameter of secondary particles in the active energy ray curable resin composition.

Silica Shape

The microparticulate silica (S) is not limited in its shape and may be spheroidal (including spherical) or non-spheroidal.

Silica Content

The microparticulate silica (S) is contained in the composition in a content of from 10 to 60 percent by weight, preferably from 20 to 55 percent by weight, and more preferably from 30 to 50 percent by weight, based on the total weight of non-volatile matter in the active energy ray curable resin composition. Particularly from the viewpoint of scratch resistance and abrasion resistance, the content of the microparticulate silica (S) is preferably not excessively low; and, in contrast, from the viewpoint of improvements in overall properties typified by impact resistance, the content of the microparticulate silica (S) is preferably not excessively high.

Exemplary Silica Microparticles

Some examples of silica microparticles usable in the present invention will be illustrated below. It should be noted, however, that these examples are not construed to limit the scope of the present invention.

Product name "NANOCRYL C146" (supplied by Hanse Chemie AG)
  Neopentyl glycol propoxy diacrylate dispersion
  Silica content: 50 percent by weight
Product name "NANOCRYL C150" (supplied by Hanse Chemie AG)
  Trimethylolpropane triacrylate dispersion
  Silica content: 50 percent by weight
Product name "MEK-ST" (supplied by Nissan Chemical Industries, Ltd.)
  MEK dispersion
  Solids content: 30 percent by weight
Product name "MEK-ST-L" (Nissan Chemical Industries, Ltd.)
  MEK dispersion
  Solids content: 30 percent by weight
Product name "MEK-ST-UP" (supplied by Nissan Chemical Industries, Ltd.)
  MEK dispersion
  Solids content: 20 percent by weight
Product name "MIBK-ST" (supplied by Nissan Chemical Industries, Ltd.)
  MIBK dispersion
  Solids content: 30 percent by weight
Product name "MIBK-SD" (supplied by Nissan Chemical Industries, Ltd.)
  Surface modified silica
  MIBK dispersion
  Solids content: 30 percent by weight
Product name "MIBK-SD-L" (supplied by Nissan Chemical Industries, Ltd.)
  Surface-modified silica
  MIBK dispersion
  Solids content: 30 percent by weight
Product name "PL-3" (supplied by Fuso Chemical Co., Ltd.)
  Colloidal silica
  MEK dispersion
  Solids content: 20 percent by weight Photoinitiator The active energy ray curable resin composition may further contain a photoinitiator. Exemplary photoinitiators include known photo-induced radical polymerization initiators not limited, which are exemplified by 1-hydroxycyclohexyl phenyl ketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl (2-hydroxy-2-propyl)ketone, 2-methyl-1-[4-(methylthio)phenyl]-2-morpholinopropan-1-one, benzoin, benzoin methyl ether, benzoin ethyl ether, benzoin isopropyl ether, benzoin n-butyl ether, benzoin phenyl ether, benzyl dimethyl ketal, benzophenone, benzoylbenzoic acid, methyl benzoylbenzoate, 4-phenylbenzophenone, hydroxybenzophenone, and acrylated benzophenone.

The photoinitiator may be used in an amount of from 1 to 20 parts by weight, and preferably from 1 to 5 parts by weight, per 100 parts by weight of the total weight of non-volatile matter in the active energy ray curable resin composition. A photoinitiator, if used in an amount of less than 1 part by weight, may invite insufficient curing and, if used in an amount of more than 5 parts by weight, may cause odor derived from the photoinitiator to remain in the coating.

Substrate

Examples of a substrate onto which the active energy ray curable resin composition according to the embodiment of the present invention is to be applied and cured include, but are not limited to, films, sheets, and molded articles of plastic base materials. Of such plastic base materials, transparent ones are preferred. Exemplary plastics for use herein include, but are not limited to, plastic base materials of thermoplastic resins such as polyesters, polyethylenes, polypropylenes, poly(ethylene terephthalate)s, cellophane, diacetylcellulose, triacetylcellulose, acetylcellulose butyrate, poly(vinyl chloride)s, poly(vinylidene chloride)s, poly(vinyl alcohol)s, ethylene-vinyl alcohol copolymers, polystyrenes, polycarbonates, polymethylpenters, polysulfones, poly(ether ketone)s, poly(ether sulfone)s, poly(ether imide)s, polyimides, and acrylic resins. Among them, acrylic resins and polycarbonate resins are preferred for use in applications requiring transparency.

Additives

The active energy ray curable resin composition according to the embodiment of the present invention may further include a variety of additives according to necessity. Examples of such additives include fillers, dyes and pigments, leveling agents, ultraviolet absorbers, photostabilizers, defoaming agents, dispersing agents, and thixotropy-imparting agents. These additives may be added in an amount of from 0 to 20 parts by weight, and preferably from 0.05 to 10 parts by weight, per 100 parts by weight of the total amount of non-volatile matter in the active energy ray curable resin composition.

Coating and Curing onto Substrate

The way to apply the active energy ray curable resin composition according to the embodiment of the present invention to the substrate is not limited and is exemplified by airless spraying, air spraying, roll coating, bar coating, gravure coating, and die coating. Among them, roll coating is preferred from the viewpoints typically of thin-film coating, partial coating, cost, and workability. The coating may be performed as a so-called "in-line coating" in which coating is performed during production process typically of a plastic substrate; or as a so-called off-line coating in which coating is performed on a plastic substrate which has been already prepared.

The resulting coated layer derived from the active energy ray curable resin composition according to the embodiment of the present invention has a thickness of preferably from 5 to 25 and more preferably from 8 to 16 µm, though not critical. A coated layer having a thickness of more than 25 µm may require a large amount of the resin composition to be applied and thereby may require a long time to be dried and cured, thus causing high cost. In contrast, a coated layer having a thickness of less than 5 µm may not sufficiently exhibit hardness derived from the curable resin.

The coated layer may have a thickness of preferably from 0.5 to 7 μm and more preferably from 1 to 5 μm when the active energy ray curable resin composition is one capable of forming a hard coating layer on a surface of a thermoplastic resin product, where the hard coating layer has very good resistance to scratches and abrasion.

After applying the active energy ray curable resin composition according to the embodiment of the present invention to the target plastic substrate, drying by heating typically with hot air may be performed when the composition contains a volatile organic solvent. The applied resin composition can be cured within a very short time by applying an active energy ray such as ultraviolet ray or electron beams to the coated layer. Exemplary light sources for use in the ultraviolet irradiation include high-pressure mercury lamps, ultra-high-pressure mercury lamps, carbon arc lamps, xenon lamps, and metal halide lamps. The irradiation time (application time) is at longest several tens of seconds and generally several seconds, although varying depending on conditions such as the type of light source and the distance between the light source and the coated surface (coated layer). An irradiation source with a lamp output of from about 80 to about 300 W/cm is generally used. When irradiation with electron beams is employed, electron beams having energy of from 50 to 1000 KeV are preferably used at an irradiance of from 2 to 5 Mrad. After the irradiation with active energy ray, heating may be performed according to necessity so as to accelerate curing.

EXAMPLES

The present invention will be illustrated in further detail with reference to several working examples below. It should be noted, however, that these examples are never construed to limit the scope of the present invention.

Preparation Examples of Urethane (Meth)acrylates

Some preparation examples of urethane (meth)acrylates will be illustrated below. Hereinafter the terms "ppm," "percent by weight," and weight fraction in percentage" in terms of concentration each indicate a concentration based on the total amount of a product containing a urethane (meth)acrylate, unless otherwise specified.

Measurement for Concentration of Isocyanate Groups

The concentration of isocyanate groups was measured in the following manner. The measurement was performed in a 100-mL glass flask with stirring using a stirrer.

A blank value was measured in the following manner. Initially, 15 mL of a solution (0.1 N) of dibutylamine in TFT was added to 15 mL of THF. In addition, three drops of bromophenol blue (1 percent by weight methanol diluent) were added to color the mixture blue, and the mixture was subjected to titration with a HCl aqueous solution (hydrochloric acid) having a normality of 0.1 N. A titer of the HCl aqueous solution at the time when discoloration was observed was defined as the blank $V_b$ (mL).

Next, an actual concentration of isocyanate groups in a sample was measured in the following manner. Initially, $W_s$ (g) of the sample was weighed, dissolved in 15 mL of THF, and combined with 15 mL of a solution (0.1 N) of dibutylamine in THF. After verifying that the mixture became a solution, three drops of bromophenol blue (1 percent by weight methanol diluent) were added to color the mixture blue, and the mixture was subjected to titration with a HCl aqueous solution (hydrochloric acid) having a normality of 0.1 N. A titer of the HCl aqueous solution at the time when discoloration was observed was defined as $V_s$ (mL).

The concentration of isocyanate groups in the sample was calculated according to the following equation:

Concentration of isocyanate groups (percent by weight)=$(V_b-V_s)\times1.005\times0.42/W_s$ Tricyclodecanedimethanol and Other Diol Compound used in Preparation Examples TCDDM: Product name "TCD Alcohol DM" (supplied by OXEA Corporation)

PEG-400: Product name "PEG-400" (supplied by Sanyo Chemical Industries, Ltd.) (polyethylene glycol having a number-average molecular weight of 400)

Diisocyanates Used in Preparation Examples

HMDI Trimer: Product name "Sumidur N3300" (supplied by Sumika Bayer Urethane Co., Ltd.) (isocyanurate compound derived from 1,6-hexamethylene diisocyanate)

IPDI: Product name "VESTANAT IPDI" (supplied by Evonik Industries AG) (isophorone diisocyanate)

Hydroxy-Containing (Meth)acrylates used in Preparation Examples

HEA: Product name "BHEA" (supplied by Nippon Shokubai Co., Ltd.) (2-hydroxyethyl acrylate)

PETIA: Product name "PETRA" (supplied by Cytec Industries Inc.) (mixture of pentaerythritol triacrylate and pentaerythritol tetraacrylate, having a hydroxyl value of 120 mgKOH/g)

Volatile Organic Solvent used in Preparation Examples

Butyl acetate (supplied by Daicel Corporation)

Preparation Example 1: UA1

Charged amounts of materials and reaction conditions actually employed will be described below. In a separable flask equipped with a thermometer and a stirrer, 200 g of butyl acetate and 516.9 g of HMDI Trimer were placed, and the internal temperature was raised to 50° C. while stirring the mixture. Next, 0.08 g of dibutyltin dilaurate was added, and, while keeping the internal temperature at 50° C., 84.1 g of TCDDM was added dropwise over one hour. Stirring was continued at 50° C. for further 2 hours after the completion of dropwise addition, and the reaction of a urethane isocyanate prepolymer was completed. The completion of the reaction was verified by that the concentration of isocyanate groups in the reaction mixture becomes equal to or less than the theoretical end-point concentration of isocyanate groups. This procedure was also performed in the other preparation examples.

In this example, a subsequent operation was performed after verifying that the concentration of isocyanate groups in the reaction mixture becomes equal to or less than the theoretical end-point concentration of isocyanate groups (8.99 percent by weight).

Next, the internal temperature was raised to 70° C., 0.08 g of dibutyltin laurate was added, and, while keeping the reaction temperature at 70° C., 199.0 g of HEA was added dropwise over 2 hours. Stirring was continued at 70° C. for further 3 hours after the completion of dropwise addition. After verifying that the concentration of isocyanate groups becomes 0.1 percent by weight or less, the reaction was completed and thereby yielded a product (UA1) containing a urethane (meth)acrylate having an average number of functional groups of 4 and having, in the skeleton, an organic group corresponding to tricyclodecanedimethanol, except for removing two hydrogen atoms of two hydroxyl groups therefrom.

Preparation Example 2: UA2

The procedure of Preparation Example 1 was repeated, except for using PEG-400 instead of TCDDM. Charged amounts of materials and reaction conditions actually employed will be described below.

In a separable flask equipped with a thermometer and a stirrer, 200 g of butyl acetate and 466.2 g of HMDI Trimer were placed, and the internal temperature was raised to 50° C. while stirring the mixture. Next, 0.08 g of dibutyltin dilaurate was added and, while keeping the internal temperature at 50° C., 154.3 g of PEG-400 was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (7.91 percent by weight).

Next, the internal temperature was raised to 70° C., 0.08 g of dibutyltin laurate was added, and, while keeping the reaction temperature at 70° C., 179.5 g of HEA was added dropwise over 2 hours. Stirring was continued at 70° C. for further 3 hours after the completion of dropwise addition. After verifying that the concentration of isocyanate groups becomes 0.1 percent by weight or less, the reaction was completed and thereby yielded a product (UA2) containing a urethane (meth)acrylate having average number of functional groups of 4 and not having, in the skeleton, an organic group corresponding to tricyclodecanedimethanol, except for removing two hydrogen atoms of two hydroxyl groups therefrom.

Preparation Example 3: UA3

The procedure of Preparation Example 1 was repeated, except for using IPDI instead of HMDI Trimer, and using HEA and PETIA in combination. Charged amounts of materials and reaction conditions actually employed will be described below.

In a separable flask equipped with a thermometer and a stirrer, 200 g of butyl acetate and 210.4 g of IPDI were placed, and the internal temperature was raised to 50° C. while stirring the mixture. Next, 0.08 g of dibutyltin dilaurate was added and, while keeping the internal temperature at 50° C., 92.9 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (7.90 percent by weight).

Next, the internal temperature was raised to 70° C., 0.08 g of dibutyltin laurate was added, and, while keeping the reaction temperature at 70° C., 55.0 g of HEA was added dropwise over one hour. Stirring was continued at 70° C. for further one hour after the completion of dropwise addition. While keeping the internal temperature at 70° C. continuously, 441.7 g of PETIA was added dropwise over one hour. Stirring was continued at 70° C. for further 3 hours after the completion of dropwise addition. After verifying that the concentration of isocyanate groups becomes 0.1 percent by weight or less, the reaction was completed and thereby yielded a product (UA3) containing a urethane (meth) acrylate having an average number of functional groups of 4 and having, in the skeleton, an organic group corresponding to tricyclodecanedimethanol, except for removing two hydrogen atoms of two hydroxyl groups therefrom.

Preparation Example 4: UA4

The procedure of Preparation Example 3 was repeated, except for using HEA alone instead of using HEA and PETIA in combination. Charged amounts of materials and reaction conditions actually employed will be described below.

In a separable flask equipped with a thermometer and a stirrer, 200 g of butyl acetate and 407.4 g of IPDI were placed, and the internal temperature was raised to 50° C. while stirring the mixture. Next, 0.08 g of dibutyltin dilaurate was added and, while keeping the internal temperature at 50° C., 179.8 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (9.78 percent by weight).

Next, the internal temperature was raised to 70° C., 0.08 g of dibutyltin laurate was added, and, while keeping the reaction temperature at 70° C., 212.8 g of HEA was added dropwise over 2 hours. Stirring was continued at 70° C. for further one hour after the completion of dropwise addition. After verifying that the concentration of isocyanate groups becomes 0.1 percent by weight or less, the reaction was completed and thereby yielded a product (UA4) containing a urethane (meth)acrylate having an average number of functional groups of 2 and having, in the skeleton, an organic group corresponding to tricyclodecanedimethanol, except for removing two hydrogen atoms of two hydroxyl groups therefrom.

Preparation Example 5: UA5

The procedure of Preparation Example 3 was repeated, except for using HEA and PETIA in different charged amounts. Charged amounts of materials and reaction conditions actually employed will be described below.

In a separable flask equipped with a thermometer and a stirrer, 200 g of butyl acetate and 370.2 g of IPDI were placed, and the internal temperature was raised to 50° C. while stirring the mixture. Next, 0.08 g of dibutyltin dilaurate was added and, while keeping the internal temperature at 50° C., 163.5 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (9.53 percent by weight).

Next, the internal temperature was raised to 70° C., 0.08 g of dibutyltin laurate was added and, while keeping the reaction temperature at 70° C., 169.2 g of HEA was added dropwise over one hour. Stirring was continued at 70° C. for further one hour after the completion of dropwise addition. While keeping the internal temperature at 70° C. continuously, 97.1 g of PETIA was added dropwise over one hour. Stirring was continued at 70° C. for further 3 hours after the completion of dropwise addition. After verifying that the concentration of isocyanate groups becomes 0.1 percent by weight or less, the reaction was completed and thereby yielded a product (UA5) containing a urethane (meth) acrylate having an average number of functional groups of 2.5 and having, in the skeleton, an organic group corresponding to tricyclodecanedimethanol, except for removing two hydrogen atoms of two hydroxyl groups therefrom.

Preparation Example 6: UA6

The procedure of Preparation Example 3 was repeated, except for using HEA and PETIA in different charged amounts. Charged amounts of materials and reaction conditions actually employed will be described below.

In a separable flask equipped with a thermometer and a stirrer, 200 g of butyl acetate and 339.3 g of IPDI were placed, and the internal temperature was raised to 50° C. while stirring the mixture. Next, 0.08 g of dibutyltin dilaurate was added and, while keeping the internal temperature at 50° C., 149.8 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (9.30 percent by weight).

Next, the internal temperature was raised to 70° C., 0.08 g of dibutyltin laurate was added, and 132.9 g of HEA was added dropwise over one hour while keeping the reaction temperature at 70° C. Stirring was continued at 70° C. for further one hour after the completion of dropwise addition. While keeping the internal temperature at 70° C. continuously, 178.0 g of PETIA was added dropwise over one hour. Stirring was continued at 70° C. for further 3 hours after the completion of dropwise addition. After verifying that the concentration of isocyanate groups becomes 0.1 percent by weight or less, the reaction was completed and thereby yielded a product (UA6) containing a urethane (meth) acrylate having an average number of functional groups of 3 and having, in the skeleton, an organic group corresponding to tricyclodecanedimethanol, except for removing two hydrogen atoms of two hydroxyl groups therefrom.

Preparation Example 7: UA7

The procedure of Preparation Example 3 was repeated, except for using HEA and PETIA in different charged amounts. Charged amounts of materials and reaction conditions actually employed will be described below.

In a separable flask equipped with a thermometer and a stirrer, 200 g of butyl acetate and 313.1 g of IPDI were placed, and the internal temperature was raised to 50° C. while stirring the mixture. Next, 0.08 g of dibutyltin dilaurate was added and, while keeping the internal temperature at 50° C., 138.2 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (9.08 percent by weight).

Next, the internal temperature was raised to 70° C., 0.08 g of dibutyltin laurate was added, and, while keeping the reaction temperature at 70° C., 102.2 g of HEA was added dropwise over one hour. Stirring was continued at 70° C. for further one hour after the completion of dropwise addition. While keeping the internal temperature at 70° C. continuously, 246.5 g of PETIA was added dropwise over one hour. Stirring was continued at 70° C. for further 3 hours after the completion of dropwise addition. After verifying that the concentration of isocyanate groups becomes 0.1 percent by weight or less, the reaction was completed and thereby yielded a product (UA7) containing a urethane (meth) acrylate having an average number of functional groups of 3.5 and having, in the skeleton, an organic group corresponding to tricyclodecanedimethanol, except for removing two hydrogen atoms of two hydroxyl groups therefrom.

Preparation Example 8: UA8

The procedure of Preparation Example 3 was repeated, except for using HEA and PETIA in different charged amounts. Charged amounts of materials and reaction conditions actually employed will be described below.

In a separable flask equipped with a thermometer and a stirrer, 200 g of butyl acetate and 271.2 g of IPDI were placed, and the internal temperature was raised to 50° C. while stirring the mixture. Next, 0.08 g of dibutyltin dilaurate was added, and 119.8 g of TCDDM was added dropwise over one hour while keeping the internal temperature at 50° C. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (8.67 percent by weight).

Next, the internal temperature was raised to 70° C., 0.08 g of dibutyltin laurate was added, and, while keeping the reaction temperature at 70° C., 53.1 g of HEA was added dropwise over one hour. Stirring was continued at 70° C. for further one hour after the completion of dropwise addition. While keeping the internal temperature at 70° C. continuously, 355.9 g of PETIA was added dropwise over one hour. Stirring was continued at 70° C. for further 3 hours after the completion of dropwise addition. After verifying that the concentration of isocyanate groups becomes 0.1 percent by weight or less, the reaction was completed and thereby yielded a product (UA8) containing a urethane (meth) acrylate having an average number of functional groups of 4.5 and having, in the skeleton, an organic group corresponding to tricyclodecanedimethanol, except for removing two hydrogen atoms of two hydroxyl groups therefrom.

Preparation Example 9: UA9

The procedure of Preparation Example 3 was repeated, except for using HEA and PETIA in different charged amounts. Charged amounts of materials and reaction conditions actually employed will be described below.

In a separable flask equipped with a thermometer and a stirrer, 200 g of butyl acetate and 254.3 g of IPDI were placed, and the internal temperature was raised to 50° C. while stirring the mixture. Next, 0.08 g of dibutyltin dilaurate was added, and, while keeping the internal temperature at 50° C., 112.2 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (8.48 percent by weight).

Next, the internal temperature was raised to 70° C., 0.08 g of dibutyltin laurate was added, and, while keeping the reaction temperature at 70° C., 33.2 g of HEA was added dropwise over one hour. Stirring was continued at 70° C. for further one hour after the completion of dropwise addition. While keeping the internal temperature at 70° C. continuously, 400.3 g of PETIA was added dropwise over one hour. Stirring was continued at 70° C. for further 3 hours after the completion of dropwise addition. After verifying that the concentration of isocyanate groups becomes 0.1 percent by weight or less, the reaction was completed and thereby yielded a product (UA9) containing a urethane (meth) acrylate having an average number of functional groups of 5 and having, in the skeleton, an organic group corresponding to tricyclodecanedimethanol, except for removing two hydrogen atoms of two hydroxyl groups therefrom.

Preparation Example 10: UA10

The procedure of Preparation Example 3 was repeated, except for using HEA and PETIA in different charged amounts. Charged amounts of materials and reaction conditions actually employed will be described below.

In a separable flask equipped with a thermometer and a stirrer, 200 g of butyl acetate and 239.3 g of IPDI were placed, and the internal temperature was raised to 50° C. while stirring the mixture. Next, 0.08 g of dibutyltin dilaurate was added, and, while keeping the internal temperature at 50° C., 105.6 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (8.30 percent by weight).

Next, the internal temperature was raised to 70° C., 0.08 g of dibutyltin laurate was added, and, while keeping the reaction temperature at 70° C., 15.6 g of HEA was added dropwise over one hour. Stirring was continued at 70° C. for further one hour after the completion of dropwise addition. While keeping the internal temperature at 70° C. continuously, 439.5 g of PETIA was added dropwise over one hour. Stirring was continued at 70° C. for further 3 hours after the completion of dropwise addition. After verifying that the concentration of isocyanate groups becomes 0.1 percent by weight or less, the reaction was completed and thereby yielded a product (UA10) containing a urethane (meth) acrylate having an average number of functional groups of 5.5 and having, in the skeleton, an organic group corresponding to tricyclodecanedimethanol, except for removing two hydrogen atoms of two hydroxyl groups therefrom.

Preparation Example 11: UA11

The procedure of Preparation Example 4 was repeated, except for using PETIA instead of HEA. Charged amounts of materials and reaction conditions actually employed will be described below.

In a separable flask equipped with a thermometer and a stirrer, 200 g of butyl acetate and 225.9 g of IPDI were placed, and the internal temperature was raised to 50° C. while stirring the mixture. Next, 0.08 g of dibutyltin dilaurate was added, and, while keeping the internal temperature at 50° C., 99.8 g of TCDDM was added dropwise over one hour. Stirring was continued at 50° C. for further 2 hours after the completion of dropwise addition, and the reaction of a urethane isocyanate prepolymer was completed.

In this example, a subsequent operation was performed after verifying that the concentration of isocyanate groups in the reaction mixture becomes equal to or less than the theoretical end-point concentration of isocyanate groups (8.12 percent by weight).

Next, the internal temperature was raised to 70° C., 0.08 g of dibutyltin laurate was added, and, while keeping the reaction temperature at 70° C., 474.3 g of PETIA was added dropwise over 2 hours. Stirring was continued at 70° C. for further one hour after the completion of dropwise addition. After verifying that the concentration of isocyanate groups becomes 0.1 percent by weight or less, the reaction was completed and thereby yielded a product (UA11) containing a urethane (meth)acrylate having an average number of functional groups of 6 and having, in the skeleton, an organic group corresponding to tricyclodecanedimethanol, except for removing two hydrogen atoms of two hydroxyl groups therefrom.

Preparation Example 12: UA12

The synthetic procedure of Preparation Example 11 was repeated, except for not using TCDDM. Charged amounts of materials and reaction conditions actually employed will be described below.

In a separable flask equipped with a thermometer and a stirrer, 200 g of butyl acetate and 153.9 g of IPDI were placed, and the internal temperature was raised to 70° C. while stirring the mixture. Next, 0.08 g of dibutyltin dilaurate was added, and, while keeping the internal temperature at 70° C., 646.1 g of PETIA was added dropwise over 2 hours. After the completion of dropwise addition, 0.08 g of dibutyltin laurate was added, and stirring was continued at 70° C. for further 3 hours. After verifying that the concentration of isocyanate groups becomes 0.1 percent by weight or less, the reaction was completed and thereby yielded a product (UA12) containing a urethane (meth)acrylate having an average number of functional groups of 6 and not having, in the skeleton, an organic group corresponding to tricyclodecanedimethanol, except for removing two hydrogen atoms of two hydroxyl groups therefrom.

Table 1 provides a summary of UA1 to UA12 synthetically prepared in above Preparation Examples 1 to 12. In Table 1, amounts of respective materials and components are by weight, and percentages are also by weight. The abbreviations represent the following compounds:

TCDDM: Tricyclodecanedimethanol (product name "TCD Alcohol DM" supplied by OXEA Corporation)

PEG-400: Polyethylene glycol having a number-average molecular weight of 400 (product name "PEG-400" supplied by Sanyo Chemical Industries, Ltd.)

HMDI Trimer: Isocyanurate compound derived from 1,6-hexamethylene diisocyanate (product name "Sumidur N3300" supplied by Sumika Bayer Urethane Co., Ltd.)

IPDI: Isophorone diisocyanate (product name "VESTANAT IPDI" supplied by Degussa AG)

HEA: 2-Hydroxyethyl acrylate (product name "RHEA" supplied by Nippon Shokubai Co., Ltd.)

PETIA: Mixture of pentaerythritol triacrylate and pentaerythritol tetraacrylate (product name "PETIA" supplied by Cytec Industries Inc.)

of two hydroxyl groups therefrom, and the microparticulate silica (S) has a volume median diameter of from 1 to 100 nm as determined by dynamic light scattering measurement. In

TABLE 1

|  |  | UA1 | UA2 | UA3 | UA4 | UA5 | UA6 | UA7 | UA8 | UA9 | UA10 | UA11 | UA12 |
|---|---|---|---|---|---|---|---|---|---|---|---|---|---|
| Average number of functional groups of urethane (meth)acrylate | | 4 | 4 | 4 | 2 | 2.5 | 3 | 3.5 | 4.5 | 5 | 5.5 | 6 | 6 |
| Diol compound | TCDDM | 84.1 |  | 92.9 | 179.8 | 163.5 | 149.8 | 138.2 | 119.8 | 112.2 | 105.6 | 99.8 |  |
|  | PEG-400 |  | 154.3 |  |  |  |  |  |  |  |  |  |  |
| Polyisocyanate | HMDI Trimer | 516.9 | 466.2 |  |  |  |  |  |  |  |  |  |  |
|  | IPDI |  |  | 210.4 | 407.4 | 370.2 | 339.3 | 313.1 | 271.2 | 254.3 | 239.3 | 225.9 | 153.9 |
| Hydroxy-containing (meth)acrylate | HEA | 199.0 | 179.5 | 55.0 | 212.8 | 169.2 | 132.9 | 102.2 | 53.1 | 33.2 | 15.6 |  |  |
|  | PETIA |  |  | 441.7 |  | 97.1 | 178.0 | 246.5 | 355.9 | 400.3 | 439.5 | 474.3 | 646.1 |
|  | Butyl acetate | 200.0 | 200.0 | 200.0 | 200.0 | 200.0 | 200.0 | 200.0 | 200.0 | 200.0 | 200.0 | 200.0 | 200.0 |
|  | Total | 1000 | 1000 | 1000 | 1000 | 1000 | 1000 | 1000 | 1000 | 1000 | 1000 | 1000 | 1000 |
|  | Non-volatile content | 80% | 80% | 80% | 80% | 80% | 80% | 80% | 80% | 80% | 80% | 80% | 80% |

Formulation Examples

A series of formulations (blends) was obtained by placing components as in Tables 2-1 and 2-2 sequentially in a stainless steel beaker while stirring and blending the components with each other using a homogenizer (product name "T.K. ROBOMIX" supplied by PRIMIX Corporation). The non-volatile content; the urethane acrylates content in non-volatile matter, and the silica content in non-volatile matter were determined according to the following methods and are indicated in lower rows in Tables 2-1 and 2-2.

Urethane (Meth)Acrylate Content

The weight ratio of urethane (meth)acrylate to the total weight of non-volatile matter in a sample formulation was calculated and is indicated as "Urethane (meth)acrylate content in non-volatile matter" in Tables 2-1 and 2-2.

Silica Content

The weight ratio of silica to the total weight of non-volatile matter in a sample formulation was calculated and is indicated as "Silica content in non-volatile matter" in Tables 2-1 and 2-2.

Formulations A1 to A13 are formulation examples applied to examples each including a urethane (meth)acrylate (A) in a content of from 10 to 40 percent by weight, and a microparticulate silica (S) in a content of 10 to 60 percent by weight, in which the urethane (meth)acrylate (A) has an average number of functional groups of from 3 to 6 and has, in the skeleton, an organic group corresponding to tricyclodecanedimethanol, except for removing two hydrogen atoms contrast, Formulations B1 to B7 are formulation examples used for comparative examples not meeting the above conditions.

Tables 2-1 and 2-2 provide a summary of Formulation Examples A1 to A13 and B1 to B7, respectively. In Tables 2-1 and 2-2, amounts and percentages of materials and components are by weight. The abbreviations represent compounds as follows:

C146: Dispersion of microparticulate silica having a volume median diameter of 15 to 25 nm in neopentyl glycol propoxy diacrylate (product name "NANOCRYL 0146" supplied by Hanse Chemie AG)

C150: Dispersion of microparticulate silica having a volume median diameter of 15 to 25 nm in trimethylolpropane triacrylate (product name "NANOCRYL C150" supplied by Hanse Chemie AG)

MEK-ST: Dispersion of microparticulate silica having a volume median diameter of 10 to 20 nm in methyl ethyl ketone (product name "MEK-ST" supplied by Nissan Chemical Industries, Ltd.)

MEK-ST-L: Dispersion of microparticulate silica having a volume median diameter of 40 to 50 nm in methyl ethyl ketone (product name "MEK-ST-L" supplied by Nissan Chemical Industries, Ltd.)

TMPTA: Trimethylolpropane triacrylate (product name "TMPTA" supplied by Daicel-Cytec Co., Ltd.)

TABLE 2-1

| Formulation | A1 | A2 | A3 | A4 | A5 | A6 | A7 | A8 | A9 | A10 | A11 | A12 | A13 |
|---|---|---|---|---|---|---|---|---|---|---|---|---|---|
| Average number of functional groups of urethane (meth)acrylate | 4 | 4 | 4 | 4 | 4 | 4 | 3 | 3.5 | 4.5 | 5 | 5.5 | 6 | 6 |
| UA1: non-volatile content 80% | 120 | 120 | 100 | 100 | 120 |  |  |  |  |  |  |  |  |
| UA2: non-volatile content 80% |  |  |  |  |  |  |  |  |  |  |  |  |  |
| UA3: non-volatile content 80% |  |  |  |  |  | 120 |  |  |  |  |  |  |  |
| UA4: non-volatile content 80% |  |  |  |  |  |  |  |  |  |  |  |  |  |
| UA5: non-volatile content 80% |  |  |  |  |  |  |  |  |  |  |  |  |  |
| UA6: non-volatile content 80% |  |  |  |  |  |  | 120 |  |  |  |  |  |  |
| UA7: non-volatile content 80% |  |  |  |  |  |  |  | 120 |  |  |  |  |  |
| UA8: non-volatile content 80% |  |  |  |  |  |  |  |  | 120 |  |  |  |  |
| UA9: non-volatile content 80% |  |  |  |  |  |  |  |  |  | 120 |  |  |  |
| UA10: non-volatile content 80% |  |  |  |  |  |  |  |  |  |  | 120 |  |  |
| UA11: non-volatile content 80% |  |  |  |  |  |  |  |  |  |  |  | 120 |  |
| UA12: non-volatile content 80% |  |  |  |  |  |  |  |  |  |  |  |  | 120 |
| C146: silica content 50% | 380 |  |  |  |  |  |  |  |  |  |  |  |  |

TABLE 2-1-continued

| Formulation | A1 | A2 | A3 | A4 | A5 | A6 | A7 | A8 | A9 | A10 | A11 | A12 | A13 |
|---|---|---|---|---|---|---|---|---|---|---|---|---|---|
| C150: silica content 50% | | 380 | | | 100 | 380 | 380 | 380 | 380 | 380 | 380 | 380 | 380 |
| MEK-ST: silica content 30% | | | 400 | | | | | | | | | | |
| MEK-ST-L: silica content 30% | | | | 400 | | | | | | | | | |
| TMPTA | | | | | 280 | | | | | | | | |
| Total | 500 | 500 | 500 | 500 | 500 | 500 | 500 | 500 | 500 | 500 | 500 | 500 | 500 |
| Non-volatile content | 95% | 95% | 40% | 40% | 95% | 95% | 95% | 95% | 95% | 95% | 95% | 95% | 95% |
| Urethane (meth)acrylate content in non-volatile matter | 20% | 20% | 40% | 40% | 20% | 20% | 20% | 20% | 20% | 20% | 20% | 20% | 20% |
| Silica content in non-volatile matter | 40% | 40% | 60% | 60% | 11% | 40% | 40% | 40% | 40% | 40% | 40% | 40% | 40% |

TABLE 2-2

| Formulation | B1 | B2 | B3 | B4 | B5 | B6 | B7 |
|---|---|---|---|---|---|---|---|
| Average number of functional groups of urethane (meth)acrylate | 4 | 2 | 2.5 | 4 | 4 | 4 | 4 |
| UA1: non-volatile content 80% | | | | 200 | 50 | 70 | 180 |
| UA2: non-volatile content 80% | 120 | | | | | | |
| UA3: non-volatile content 80% | | | | | | | |
| UA4: non-volatile content 80% | | 120 | | | | | |
| UA5: non-volatile content 80% | | | 120 | | | | |
| UA6: non-volatile content 80% | | | | | | | |
| UA7: non-volatile content 80% | | | | | | | |
| UA8: non-volatile content 80% | | | | | | | |
| UA9: non-volatile content 80% | | | | | | | |
| UA10: non-volatile content 80% | | | | | | | |
| UA11: non-volatile content 80% | | | | | | | |
| UA12: non-volatile content 80% | | | | | | | |
| C146: silica content 50% | | | | | | | |
| C150: silica content 50% | 380 | 380 | 380 | | 450 | | |
| MEK-ST: silica content 30% | | | | | | 430 | |
| MEK-ST-L: silica content 30% | | | | | | | 320 |
| TMPTA | | | | 300 | | | |
| Total | 500 | 500 | 500 | 500 | 500 | 500 | 500 |
| Non-volatile content | 95% | 95% | 95% | 92% | 98% | 37% | 48% |
| Urethane (meth)acrylate content in non-volatile matter | 20% | 20% | 20% | 35% | 8% | 30% | 60% |
| Silica content in non-volatile matter | 40% | 40% | 40% | 0% | 46% | 70% | 40% |

Examples and Comparative Examples

A series of compositions according to examples and comparative examples was prepared by sequentially placing components as in Tables 3-1 and 3-2 in a stainless steel beaker while stirring and blending the components with each other using a homogenizer (product name "T.K. ROBOMIX" supplied by PRIMIX Corporation). The photoinitiator in Table 3 is 1-hydroxycyclohexyl phenyl ketone (product name "IRGACURE 184" supplied by BASF SE).

Methods for Measurement, Testing, and Evaluation

Using the compositions according to the examples and comparative examples, coated panels were prepared and subjected to tests for scratch resistance, abrasion resistance, impact resistance, and accelerated weathering resistance according to the following methods. The test results are shown in lower rows in Tables 3-1 and 3-2.

Preparation of Coated Panels

A series of coated panels each having a coating thickness of from 8 to 10 μm was prepared by applying each composition to a 2-mm thick polycarbonate panel (supplied by Nippon Testpanel Co., Ltd.) using a bar coater No. 12, drying the coated layer in an oven at 80° C. for 5 minutes, curing the dried layer through irradiation using a UV irradiator (product name "EYE INVERTOR GRANDAGE ECS-401GX" supplied by Eye Graphics Co., Ltd.) at a peak irradiance of 400 mW/cm$^2$ and an integrated light quantity of 860 mJ/cm$^2$.

Scratch Resistance

A 60-degree gloss of the coated surface of a sample before testing was measured with a gloss meter, and the coated surface was rubbed through 100-times reciprocating movements of a #0000 steel wool under a load of 1 kg/cm$^2$. After the testing, the gloss of the rubbed portion was measured in the same manner as that before testing, a gloss retention was determined by calculation according to an equation, the calculated gloss retention was evaluated according to the following criteria. The results are indicated as "Scratch resistance" in Tables 3-1 and 3-2. The equation and the criteria are as follows:

Gloss retention %=(Gloss after testing)/(Gloss before testing)×100

A (Very good): 95% or more
B (Good): 90% or more and less than 95%
C (Fair): 80% or more and less than 90%
D (Poor): less than 80%

Abrasion Resistance

The hazes of the coated surface of a sample were measured with a hazemeter before and after testing using a Taber Abrader, and the difference in haze (Δhaze) between before and after testing was evaluated according to criteria mentioned below, and the results are indicated as "Abrasion resistance" in Tables 3-1 and 3-2. A truck wheel (abrading wheel) used in testing is the product name "CS-10F" (supplied by TABER Industries) and was rotated 100 times under a load of 500 g at a rate of 60 revolutions per 1 minute. The criteria are as follows:

A (Very good): less than 5
B (Good): 5 or more and less than 10
C (Fair): 10 or more and less than 15
D (Poor): 15 or more Impact Resistance A ¼-inch impact head (500 g load) was dropped on the coated surface of a sample, the height at the highest position of the impact head at which the coating does not break was measured, and the impact resistance was evaluated according to criteria mentioned below. The results are indicated as "Impact resistance" in Tables 3-1 and 3-2. The criteria are as follows:

A (Very good): 40 cm or more
B (Good): 30 cm or more and less than 40 cm
C (Fair): 20 cm or more and less than 30 cm
D (Poor): less than 20 cm Accelerated Weathering Resistance A sample with a coated surface was subjected to accelerated weathering testing using the Xenon Weather-Ometer, and 1500 hours into the testing, the surface was observed, and the accelerated weathering resistance was evaluated according to criteria mentioned below. The results are indicated as "Accelerated weathering resistance" in Tables 3-1 and 3-2. The criteria are as follows:

A (Very good): no change
B (Good): no cracking, but slightly lowered gloss
C (Fair): no cracking, but apparently lowered gloss
D (Poor): cracking in overall surface

TABLE 3-2

Comparative Examples (Amounts and percentages in respective materials and components are by weight)

| | Comparative Examples | | | | | | |
|---|---|---|---|---|---|---|---|
| | 1 | 2 | 3 | 4 | 5 | 6 | 7 |
| Formulation B1 | 250 | | | | | | |
| Formulation B2 | | 250 | | | | | |
| Formulation B3 | | | 250 | | | | |
| Formulation B4 | | | | 250 | | | |
| Formulation B5 | | | | | 250 | | |
| Formulation B6 | | | | | | 500 | |
| Formulation B7 | | | | | | | 500 |
| Photoinitiator | 4.3 | 4.3 | 4.3 | 6.9 | 4.0 | 1.7 | 4.3 |
| Butyl acetate | 351 | 351 | 351 | 335 | 369 | | 103 |
| Total | 605.3 | 605.3 | 605.3 | 591.9 | 623.0 | 501.7 | 607.3 |
| Non-volatile content | 40% | 40% | 40% | 40% | 40% | 37% | 40% |
| Coating layer thickness (μm) | 10 | 10 | 10 | 9 | 10 | 8 | 10 |
| Scratch resistance | C | C | C | D | B | C | D |
| Abrasion resistance | C | C | C | D | A | B | D |
| Impact resistance | A | B | B | A | D | D | A |
| Accelerated weathering resistance | C | B | B | B | C | C | B |

Testing Results

The results in lower rows in Table 3-1 demonstrate as follows. Active energy ray curable resin compositions contributed to good resistance to scratches and abrasion when the compositions each included a urethane (meth)acrylate (A) and a microparticulate silica (S) in specific proportions, where the urethane (meth)acrylate (A) had an average number of functional groups of from 3 to 6 and had, in the skeleton, an organic group corresponding to tricyclodecanedimethanol, except for removing two hydrogen atoms of two hydroxyl groups therefrom, and the microparticulate silica had a volume median diameter of from 1 to 100 nm as determined by dynamic light scattering measurement. The

TABLE 3-1

Examples (Amounts and percentages in respective materials and components are by weight)

| Examples | 1 | 2 | 3 | 4 | 5 | 6 | 7 | 8 | 9 | 10 | 11 | 12 | 13 |
|---|---|---|---|---|---|---|---|---|---|---|---|---|---|
| Formulation A1 | 250 | | | | | | | | | | | | |
| Formulation A2 | | 250 | | | | | | | | | | | |
| Formulation A3 | | | 500 | | | | | | | | | | |
| Formulation A4 | | | | 500 | | | | | | | | | |
| Formulation A5 | | | | | 250 | | | | | | | | |
| Formulation A6 | | | | | | 250 | | | | | | | |
| Formulation A7 | | | | | | | 250 | | | | | | |
| Formulation A8 | | | | | | | | 250 | | | | | |
| Formulation A9 | | | | | | | | | 250 | | | | |
| Formulation A10 | | | | | | | | | | 250 | | | |
| Formulation A11 | | | | | | | | | | | 250 | | |
| Formulation A12 | | | | | | | | | | | | 250 | |
| Formulation A13 | | | | | | | | | | | | | 250 |
| Photoinitiator | 4.3 | 4.3 | 2.4 | 2.4 | 6.4 | 4.3 | 4.3 | 4.3 | 4.3 | 4.3 | 4.3 | 4.3 | 4.3 |
| Butyl acetate | 351 | 351 | | | 351 | 351 | 351 | 351 | 351 | 351 | 351 | 351 | 351 |
| Total | 605.3 | 605.3 | 502.4 | 502.4 | 607.4 | 605.3 | 605.3 | 605.3 | 605.3 | 605.3 | 605.3 | 605.3 | 605.3 |
| Non-volatile content | 40% | 40% | 40% | 40% | 40% | 40% | 40% | 40% | 40% | 40% | 40% | 40% | 40% |
| Coating layer thickness (μm) | 10 | 9 | 10 | 9 | 10 | 9 | 10 | 10 | 10 | 10 | 9 | 10 | 9 |
| Scratch resistance | B | B | B | B | B | A | B | A | A | A | A | A | A |
| Abrasion resistance | B | B | B | B | B | A | B | A | A | A | A | A | A |
| Impact resistance | A | B | A | A | B | B | B | B | B | B | C | D | D |
| Accelerated weathering resistance | B | B | B | B | B | B | B | B | B | C | C | D | D | urethane (meth)acrylate (A), when having an average number of functional groups of from 3 to 5, gave active energy ray curable resin compositions capable of forming hard coating layers having good resistance to impact and weather in addition to good resistance to scratches and abrasion. The urethane (meth)acrylate (A), when having an average number of functional groups of from 3.5 to 6, gave active energy ray curable resin composition contributing to very good resistance to scratches and abrasion.

The results in lower rows of Table 3-2 demonstrate as follows. Comparative Example 2 and 3 each employed a urethane (meth)acrylate having a number of functional groups of less than 3; whereas Comparative Examples 4 to 7 had a content of a urethane (meth)acrylate or of a microparticulate silica (S) out of the specific range. These comparative examples were insufficient in two or more of scratch resistance, abrasion resistance, impact resistance, and weather resistance and still failed to offer very good scratch resistance and abrasion resistance even when focusing attention on the two properties.

INDUSTRIAL APPLICABILITY

The active energy ray curable resin compositions according to the embodiments of the present invention are each capable of forming a hard coating layer on a surface of a thermoplastic resin product, where the hard coating layer is one having strong resistance to impact and weather without deterioration in resistance to scratches and abrasion, or one having very good resistance to scratches and abrasion. The active energy ray curable resin compositions are thereby useful typically as active energy ray curable resin compositions for the formation of hard coating layers on the surface of thermoplastic resin products such as films, sheets, laminates, molded articles and extruded profiles. The active energy ray curable resin compositions, when capable of forming a hard coating layer having very good scratch resistance and abrasion resistance on the surface of a thermoplastic resin product, are useful particularly in applications where the resin compositions are each applied as a hard-coat film or another very thin coating.

The invention claimed is:

1. An active energy ray curable resin composition comprising:
    a urethane (meth)acrylate (A) having an organic group in molecular skeleton and having an average number of functional groups of from 3 to 6, the organic group corresponding to a tricyclodecanedimethanol, except for removing two hydrogen atoms of two hydroxyl groups from the tricyclodecanedimethanol; and
    a microparticulate silica (S) having a volume median diameter of from 1 to 100 nm as determined by dynamic light scattering measurement,
    wherein the active energy ray curable resin composition comprises:
    the urethane (meth)acrylate (A) in a content of from 10 to 40 percent by weight; and
    the microparticulate silica (S) in a content of from 10 to 60 percent by weight,
    based on the total weight of non-volatile matter in the active energy ray curable resin composition, where the tricyclodecanedimethanol is represented by Formula (1) expressed as follows:

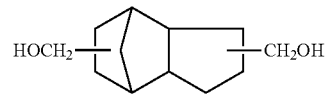

(1)

wherein the average number of functional groups of the urethane (meth)acrylate (A) is the average number of (meth)acryloyl groups possessed by 1 molecule of the urethane (meth)acrylate (A).

2. The active energy ray curable resin composition according to claim 1,
    wherein the urethane (meth)acrylate (A) is obtained by allowing a tricyclodecanedimethanol (X), a polyisocyanate (Y), and a hydroxy-containing (meth)acrylate (Z) to react with one another.

3. The active energy ray curable resin composition according to claim 1, wherein the urethane (meth)acrylate (A) is obtained by allowing a tricyclodecanedimethanol (X) to react with a polyisocyanate (Y) until a concentration of isocyanate groups in a reaction mixture becomes equal to or less than an end-point concentration of isocyanate groups, to give a urethane isocyanate prepolymer; and allowing the urethane isocyanate prepolymer to react with a hydroxy-containing (meth)acrylate (Z).

4. The active energy ray curable resin composition according to claim 1, for the formation of a hard coating on a surface of a thermoplastic resin molded article.

5. A thermoplastic resin molded article having, on a surface thereof, a cured coating cured from the active energy ray curable resin composition of claim 1.

6. The active energy ray curable resin composition according to claim 2, wherein the urethane (meth)acrylate (A) is obtained by allowing a tricyclodecanedimethanol (X) to react with a polyisocyanate (Y) until a concentration of isocyanate groups in a reaction mixture becomes equal to or less than an end-point concentration of isocyanate groups, to give a urethane isocyanate prepolymer; and allowing the urethane isocyanate prepolymer to react with a hydroxy-containing (meth)acrylate (Z).

7. The active energy ray curable resin composition according to claim 2, for the formation of a hard coating on a surface of a thermoplastic resin molded article.

8. The active energy ray curable resin composition according to claim 3, for the formation of a hard coating on a surface of a thermoplastic resin molded article.

9. The active energy ray curable resin composition according to claim 6, for the formation of a hard coating on a surface of a thermoplastic resin molded article.

10. A thermoplastic resin molded article having, on a surface thereof, a cured coating cured from the active energy ray curable resin composition of claim 2.

11. A thermoplastic resin molded article having, on a surface thereof, a cured coating cured from the active energy ray curable resin composition of claim 3.

12. A thermoplastic resin molded article having, on a surface thereof, a cured coating cured from the active energy ray curable resin composition of claim 4.

13. A thermoplastic resin molded article having, on a surface thereof, a cured coating cured from the active energy ray curable resin composition of claim 6.

14. An active energy ray curable resin composition comprising:
    a urethane (meth)acrylate (A) having an organic group in molecular skeleton and having an average number of functional groups of from 3 to 5.5, the organic group corresponding to a tricyclodecanedimethanol, except for removing two hydrogen atoms of two hydroxyl groups from the tricyclodecanedimethanol; and a microparticulate silica (S) having a volume median diameter of from 1 to 100 nm as determined by dynamic light scattering measurement, wherein the active energy ray curable resin composition comprises:

the urethane (meth)acrylate (A) in a content of from 10 to 40 percent by weight; and the microparticulate silica (S) in a content of from 10 to 60 percent by weight, based on the total weight of non-volatile matter in the active energy ray curable resin composition, where the tricyclodecanedimethanol is represented by Formula (1) expressed as follows:

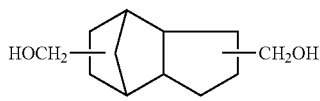

(1)

wherein the average number of functional groups of the urethane (meth)acrylate (A) is the average number of (meth)acryloyl groups possessed by 1 molecule of the urethane (meth)acrylate (A).

15. An active energy ray curable resin composition comprising:

a urethane (meth)acrylate (A) having an organic group in molecular skeleton and having an average number of functional groups of from 3 to 6, the organic group corresponding to a tricyclodecanedimethanol, except for removing two hydrogen atoms of two hydroxyl groups from the tricyclodecanedimethanol, being obtained by allowing a tricyclodecanedimethanol (X), a polyisocyanate (Y), and a hydroxyl-containing (meth)acrylate (Z) to react with one another; and a microparticulate silica (S) having a volume median diameter of from 1 to 100 nm as determined by dynamic light scattering measurement, wherein the hydroxyl-containing (meth)acrylate (Z) includes a mixture of pentaerythritol triacrylate and pentaerythritol tetraacrylate;

wherein the active energy ray curable resin composition comprises:

the urethane (meth)acrylate (A) in a content of from 10 to 40 percent by weight; and the microparticulate silica (S) in a content of from 10 to 60 percent by weight, based on the total weight of non-volatile matter in the active energy ray curable resin composition, where the tricyclodecanedimethanol is represented by Formula (1) expressed as follows:

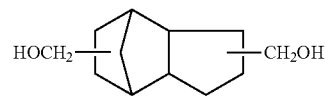

(1)

wherein the average number of functional groups of the urethane (meth)acrylate (A) is the average number of (meth)acryloyl groups possessed by 1 molecule of the urethane (meth)acrylate (A).

* * * * *